United States Patent
Taoka et al.

(10) Patent No.: US 9,692,332 B2
(45) Date of Patent: Jun. 27, 2017

(54) POWER CONVERSION DEVICE

(71) Applicant: DAIKIN INDUSTRIES, LTD., Osaka-shi, Osaka (JP)

(72) Inventors: Kentarou Taoka, Osaka (JP); Shinichi Ishizeki, Osaka (JP); Motonobu Ikeda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/117,834

(22) PCT Filed: Feb. 17, 2015

(86) PCT No.: PCT/JP2015/000716
§ 371 (c)(1),
(2) Date: Aug. 10, 2016

(87) PCT Pub. No.: WO2015/141124
PCT Pub. Date: Sep. 24, 2015

(65) Prior Publication Data
US 2016/0359438 A1 Dec. 8, 2016

(30) Foreign Application Priority Data
Mar. 18, 2014 (JP) .................. 2014-055131

(51) Int. Cl.
*H02P 6/18* (2016.01)
*H02P 6/20* (2016.01)
(Continued)

(52) U.S. Cl.
CPC ............... *H02P 6/20* (2013.01); *H02M 7/46* (2013.01); *H02M 7/537* (2013.01); *H02P 1/029* (2013.01);
(Continued)

(58) Field of Classification Search
CPC ...... H02P 6/182; H02P 6/085; H02P 2209/07; H02P 27/08; H02P 27/06; H02M 7/53875; H02M 5/271
(Continued)

(56) References Cited

U.S. PATENT DOCUMENTS 5,694,010 A * 12/1997 Oomura .................... H02P 6/34
318/400.07
5,949,204 A * 9/1999 Huggett .................... H02P 6/14
318/400.02
(Continued)

FOREIGN PATENT DOCUMENTS

JP 7-337080 A 12/1995
JP 11-4595 A 1/1999
(Continued)

OTHER PUBLICATIONS

International Search Report for PCT/JP2015/000716 (PCT/ISA/210) mailed on May 19, 2015.

*Primary Examiner* — Rina Duda
(74) *Attorney, Agent, or Firm* — Birch, Stewart, Kolasch & Birch, LLP

(57) ABSTRACT

A failure in the activation, of a motor, caused by external noise superimposed on an induced voltage is reduced. A detection circuit is connected to a connection node provided between an upper-arm switching element and a lower-arm switching element, and detects the induced voltage of a fan motor before activation. The switching controller activates the fan motor in accordance with a result of detection by the detection circuit. While the detection circuit detects the induced voltage, the switching controller performs switching control which involves alternately turning ON and OFF of the lower-arm switching element.

4 Claims, 4 Drawing Sheets

(51) Int. Cl.
  *H02P 6/182* (2016.01)
  *H02P 1/02* (2006.01)
  *H02P 6/22* (2006.01)
  *H02M 7/46* (2006.01)
  *H02M 7/537* (2006.01)
  *H02P 6/14* (2016.01)
  *H02P 27/06* (2006.01)

(52) U.S. Cl.
  CPC ............... *H02P 6/14* (2013.01); *H02P 6/182* (2013.01); *H02P 6/22* (2013.01); *H02P 27/06* (2013.01); *H02P 2203/03* (2013.01)

(58) Field of Classification Search
  USPC ....... 318/798, 800, 801, 599, 811, 459, 500, 318/400.34
  See application file for complete search history.

(56) References Cited

U.S. PATENT DOCUMENTS

| | | | |
|---|---|---|---|
| 6,397,611 B1 * | 6/2002 | Yamato | F24F 11/008 62/180 |
| 6,469,461 B1 * | 10/2002 | Konda | H02P 6/34 318/400.21 |

FOREIGN PATENT DOCUMENTS

| | | | |
|---|---|---|---|
| JP | 2004-166382 A | 6/2004 |
| JP | 2008-236842 A | 10/2008 |
| JP | 2009-261043 A | 11/2009 |
| JP | 2012-239335 A | 12/2012 |

* cited by examiner

POWER CONVERSION DEVICE

TECHNICAL FIELD

The present invention relates to a power conversion device supplying power to a motor included in an air conditioner.

BACKGROUND ART

An outdoor unit of an air conditioner includes: an outdoor heat exchanger exchanging heat between outdoor air and a refrigerant; an outdoor fan sending the outdoor air to the outdoor heat exchanger; and a fan motor acting as a drive source of the outdoor fan. Since the outdoor unit is placed outside, the outdoor fan in a stopped state could rotate by an influence of, for example, wind. Moreover, immediately after stopping the operation, the outdoor fan keeps rotating for a while due to moment of inertia. When the outdoor fan is activated under these circumstances, the fan motor could be intentionally left undriven, depending on a rotation speed of the outdoor fan, because sufficient outdoor air is sent to the outdoor heat exchanger. Thus, it is desirable to know a state of the outdoor fan before its activation.

Patent Document 1 discloses a technic which involves detecting an induced voltage of a fan motor before activation, and determining an activation sequence of the fan motor based on the result of the detection.

CITATION LIST

Patent Document

PATENT DOCUMENT 1: Japanese Unexamined Patent Publication No. H07-337080

SUMMARY OF THE INVENTION

Technical Problem

In detecting the induced voltage of the fan motor before activation, a detection circuit for detecting the induced voltage has to have an input connected to a winding of the fan motor. Furthermore, the detection circuit desirably has the highest possible impedance for the least possible power loss, the power loss occurring because the detection circuit is connected to the fan motor.

However, a higher impedance inevitably superimposes more external noise, generated by apparatuses such as a compressor included in the outdoor unit, on the result of detection by the detection circuit. If this detection result is used for determining an activation sequence of the fan motor as disclosed in PATENT DOCUMENT 1, a false determination could be made for starting the fan motor, causing a failure in the activation of the fan motor.

In view of the forgoing background, it is therefore an object of the present invention to keep a motor from a failure in its activation caused by external noise superimposed on the induced voltage.

Solution to the Problem

A first aspect of this present disclosure is directed to a power conversion device which supplies power to a motor (77) included in an air conditioner (70). The power conversion device includes: an inverter circuit (23) including: an upper-arm switching element (25u,25v,25w) and a lower-arm switching element (26u, 26v, 26w) connected in series to each other, and a connection node (cn1, cn2, cn3) provided between the upper-arm switching element (25u,25v, 25w) and the lower-arm switching element (26u, 26v, 26w), and connected to the motor (77); a detection circuit (27) connected to the connection node (cn1, cn2, cn3), and configured to detect an induced voltage of the motor (77) before activation; and a switching controller (28) capable of activating the motor (77), by controlling ON and OFF of the upper-arm switching element (25u,25v,25w) and the lower-arm switching element (26u, 26v, 26w), in accordance with a result of the detection by the detection circuit (27), the switching controller (28) being configured to perform switching control causing the lower-arm switching element (26w) to alternately turn ON and OFF when the detection circuit (27) detects the induced voltage.

According to the first aspect of the present disclosure, an apparent impedance of the current path from the motor (77) to the lower-arm switching element (26w) becomes lower with the switching control performed on the lower-arm switching element (26w) than without the switching control. This low impedance keeps external noise from being superimposed on the induced voltage generated in the motor (77). Even if the external noise is superimposed on the induced voltage, the current having the external noise flows toward the current path (i.e., toward the lower-arm switching element (26w)). Hence, the detection circuit (27) may detect an external-noise-free induced voltage, and the switching controller (28) may activate the motor (77) in accordance with the induced voltage. Such features may reduce the occurrence of a failure in the activation of the motor (77).

In a second aspect of the present disclosure according to the first aspect, the lower-arm switching element (26w) may alternately turn ON and OFF at a predetermined frequency in the switching control, and the predetermined frequency may be higher than a frequency of the induced voltage.

In the switching control, this high frequency may appropriately lower the impedance of the current path including the lower-arm switching element (26w). As a result, the detection circuit (27) may detect an induced voltage having (i) no external noise superimposed thereon and (ii) a voltage value which is not excessively low.

In a third aspect of the present disclosure according to the first aspect or the second aspect, the motor (77) may have phases, the upper-arm switching element (25u,25v,25w) and the lower-arm switching element (26u, 26v, 26w), connected in series to each other, may constitute a switching element pair (24u, 24v, 24w) including as many switching element pairs as the phases of the motor (77), the switching element pairs being included in the inverter circuit (23), the detection circuit (27) may detect the induced voltage in at least one of the phases in the motor (77); and the switching controller (28) may perform the switching control on the lower-arm switching element (26w) corresponding to the one phase intended for the detection of the induced voltage.

Here, the switching control is provided to the lower-arm switching element (26w) corresponding to the phase intended for the detection of the induced voltage. Hence, the detection circuit (27) may detect an induced voltage with no external noise superimposed thereon. Thus, the switching control does not have to be provided to the lower-arm switching elements (26u, 26v) corresponding to the phases not intended for the detection of the induced voltage. This feature allows the switching control to be performed easily.

In a fourth aspect of the present disclosure according to the third aspect, the detection circuit (27) may include detection circuits (127a, 127b), the induced voltage may include induced voltages each having one of two phases included in the phases, and each of the detection circuits (127a, 127b) may detect a different one of the induced voltages, and the switching controller (28) may obtain a voltage difference between the detected induced voltages each having one of the two phases, and activate the motor (77), using the obtained voltage difference.

Here, the switching controller (28) provides the switching control to the lower-arm switching element (26v, 26w) to calculate the voltage difference between the induced voltages with no external noise superimposed thereon and each having one of the two phases. Such features may reduce the occurrence of a failure in the activation of the motor (77).

In a fifth aspect of the present disclosure according to any one of the first to fourth aspects, the switching controller (28) may perform the switching control until the switching controller (28) starts activating the motor (77).

The lower-arm switching element (26w) is used not only for the switching control, but also for the activation of the motor (77); however, the switching control is performed on the lower-arm switching element (26w) until the motor (77) starts its activation. Such features allow the motor (77) to be activated without any problems.

Advantages of the Invention

The first and fourth aspects of the present disclosure contribute to reducing a failure in the activation of the motor (77).

The second aspect allows the detection circuit (27) to detect an induced voltage having (i) no external noise superimposed thereon and (ii) a voltage value which is not excessively low.

In the third aspect, the switching control does not have to be provided to the lower-arm switching elements (26u, 26v) corresponding to the phases not intended for the detection of the induced voltage. This feature allows the switching control to be performed easily.

The fifth aspect allows the motor (77) to be activated without any problems.

DESCRIPTION OF EMBODIMENTS

Described hereinafter are embodiments of the present invention, with reference to the drawings. Note that the embodiments are essentially preferable examples, and are not intended to limit the scope of the present invention, of the application of the present invention, or of the use of the present invention.

First Embodiment

Outline

Figure 1:
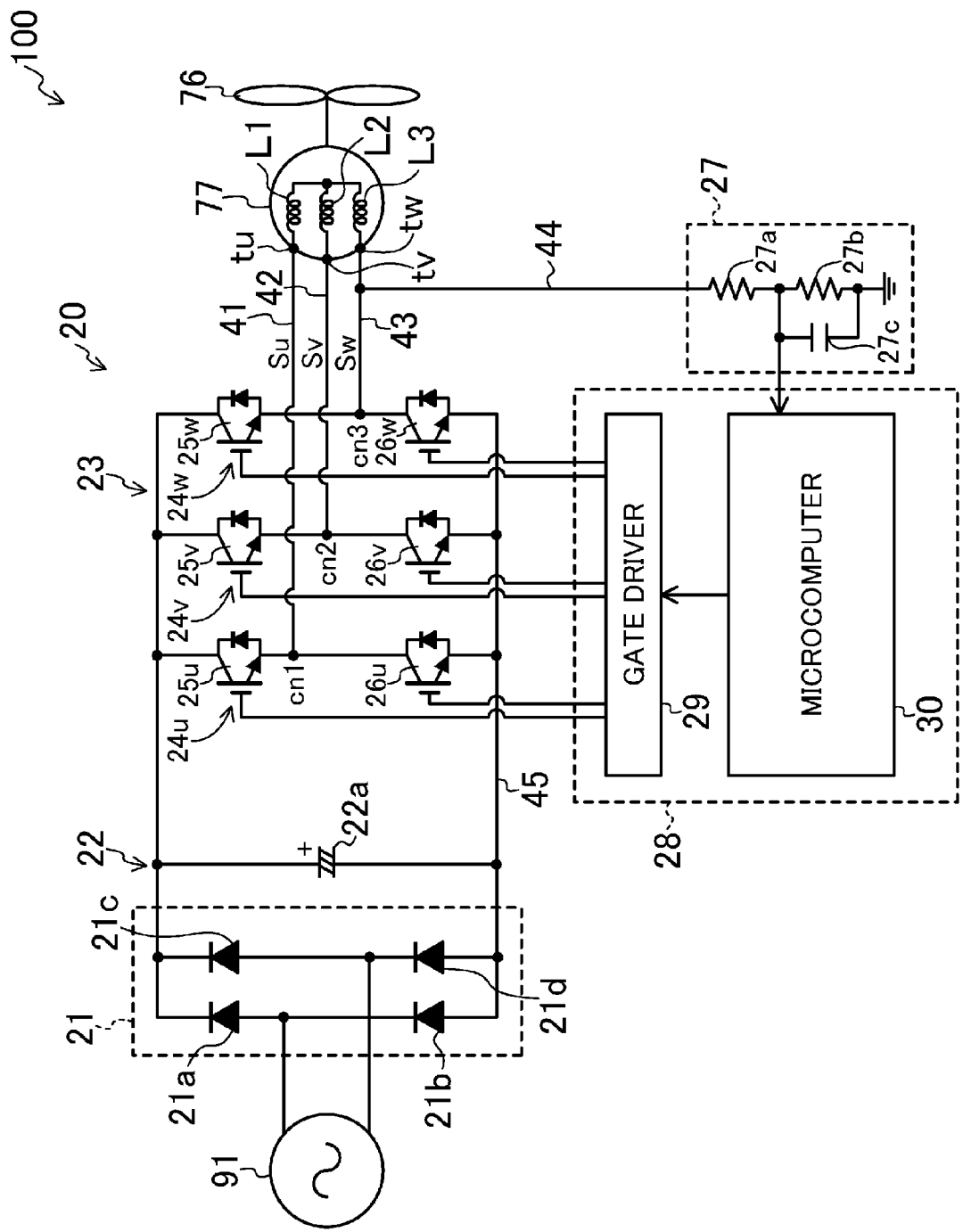
FIG. 1 is a block diagram of a motor driving system including a power conversion device according to a first embodiment.

As illustrated in FIG. 1, a motor driving system (100) includes a fan motor (77) (equivalent to a motor), and a power conversion device (20) according to this first embodiment.

The fan motor (77) is a three-phase brushless direct current (DC) motor including a stator and a rotor. The stator includes multiple drive coils (L1, L2, L3), and the rotor includes a permanent magnet.

Figure 2:
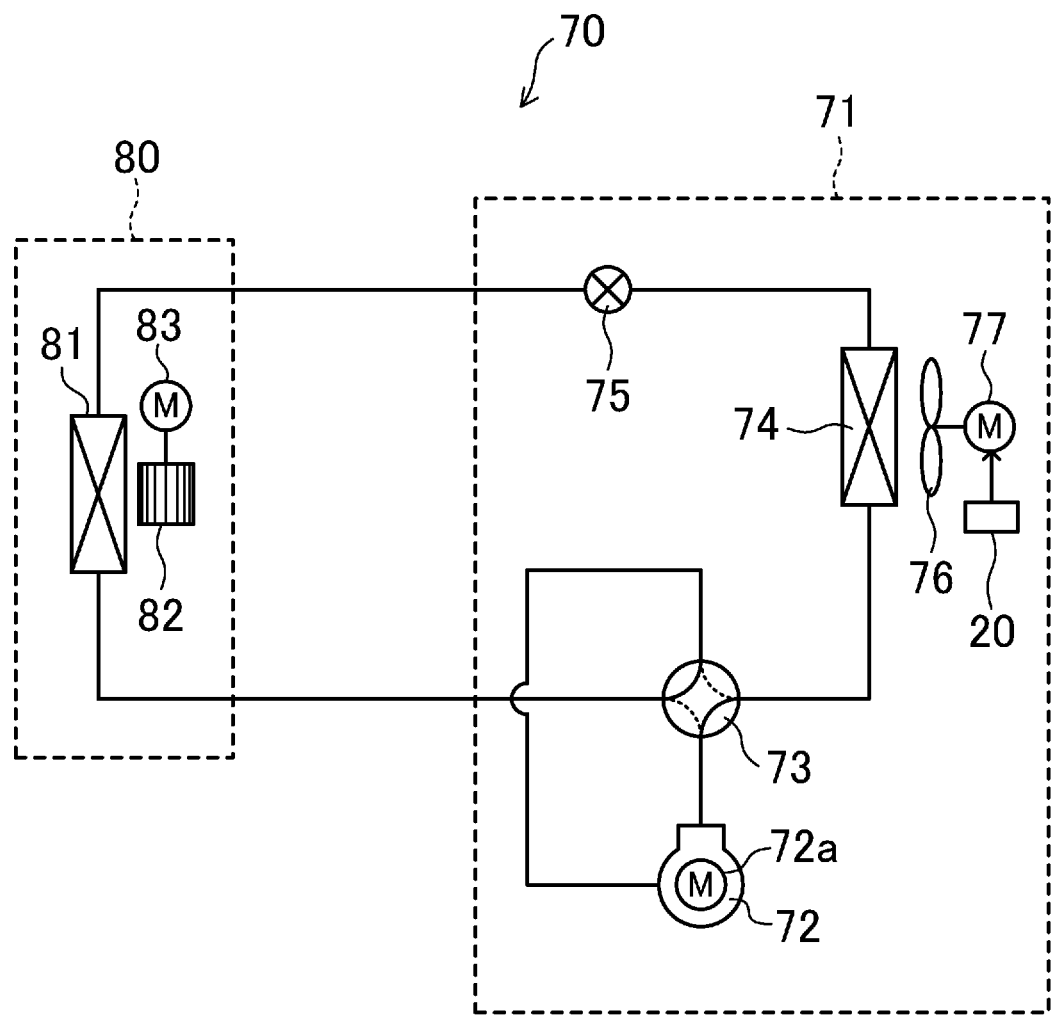
FIG. 2 is a schematic diagram illustrating a configuration of an air conditioner.

Here, as illustrated in FIG. 2, the fan motor (77) of the first embodiment is a drive source—an outdoor fan motor—of an outdoor fan (76) included in an outdoor unit (71) of an air conditioner (70). The fan motor (77) has a drive shaft connected to a rotating shaft of the outdoor fan (76).

The outdoor unit (71) includes a compressor (72) compressing a refrigerant; a compressor motor (72a) acting as a drive source of the compressor (72); a four-way switching valve (73) switching a flow of the refrigerant; an outdoor heat exchanger (74) exchanging heat between the refrigerant and outdoor air; an expansion valve (75) decompressing the refrigerant; the outdoor fan (76) supplying the outdoor air to the outdoor heat exchanger (74); and the fan motor (77). The outdoor unit (71) further includes the power conversion device (20). The air conditioner (70) includes an indoor unit (80) having: an indoor heat exchanger (81) exchanging heat between the refrigerant and indoor air; an indoor fan (82) blowing the air after the heat exchange into a room; and an indoor fan motor (83).

As illustrated in FIG. 1, the power conversion device (20) converts input alternate-current (AC) power, provided from a commercial power source (91), into output AC power (SU, SV, SW), and supplies the converted output AC power to the fan motor (77). Here, the commercial power source (91) is an AC power source. Such features enable the fan motor (77) to run.

<Configuration of Power Conversion Device>

The power conversion device (20) mainly includes: a rectifying circuit (21); a DC link (22); an inverter circuit (23); a detection circuit (27); and a switching controller (28).

The rectifying circuit (21) is a diode bridge circuit including multiple diodes (21a, 21b, 21c, 21d). The rectifying circuit (21) rectifies the input AC power from the commercial power source (91).

The DC link (22) has an electrolytic capacitor (22a), and causes the electrolytic capacitor (22a) to smooth a voltage and input the smoothed voltage into the inverter circuit (23).

The inverter circuit (23) includes as many switching element pairs (24u, 24v, 24w)—three switching element pairs—as phases (i.e., three phases) of the motor (77). Each of the switching element pairs (24u, 24v, 24w) includes one upper-arm switching element (25u, 25v, 25w) and one lower-arm switching element (26u, 26v, 26w) connected in series to each other. Specifically, the inverter circuit (23) includes three upper-arm switching elements (25u, 25v, 25w) and three lower-arm switching elements (26u, 26v, 26w). In each switching element pair (24u, 24v, 24w), the upper-arm switching element (25u, 25v, 25w) and the lower-arm switching element (26u, 26v, 26w) have a connection node (cn1, cn2, cn3) therebetween connected through a wire (41, 42, 43) to a corresponding terminal (tu, tv, tw) of the drive coil (L1, L2, L3) of the fan motor (77).

When the outdoor fan (76) operates, the switching controller (28) controls pulse width modulation (PWM) to turn ON and OFF each of the switching elements (25u, 25v, 25w,

26u, 26v, 26w). Then, the inverter circuit (23) converts the smoothed DC voltage into an AC voltage, and supplies the converted output AC power (SU, SV, SW) to the fan motor (77). Such features enable the fan motor (77) to run.

The detection circuit (27) has an input connected through a wire (44, 43) to a connection node (cn3) and to the terminal (tw) of the drive coil (L3). Specifically, the detection circuit (27) is positioned downstream from the inverter circuit (23). The detection circuit (27) detects a voltage of the drive coil (L3) of the fan motor (77) before activation. Hence, if an induced voltage is generated in the fan motor (77) before the start of the fan motor (77) of which the outdoor fan (76) is in a stopped state, the detection circuit (27) detects the induced voltage in one of the three phases; namely, a W-phase.

Note that the detection circuit (27) does not have to detect the induced voltage once the fan motor (77) has been activated.

Example cases where the induced voltage is generated in the fan motor (77) before activation include the cases where (i) the outdoor fan (76) rotates in reverse or forward direction by an influence of, for example, wind, and (ii) the outdoor fan (76) still keeps rotating, immediately after stopping its operation, due to moment of inertia.

Described next is an example of a configuration of the detection circuit (27). As illustrated in FIG. 1, the detection circuit (27) includes: a first resistor (27a); a second resistor (27b); and a capacitor (27c). The first resistor (27a) and the second resistor (27b) are connected in series to the wire (44). A voltage of "r1·Vw/(r1+r2)" is applied across the first resistor (27a) and a voltage of "r2·Vw/(r1+r2)" is applied across the second resistor (27b), where "Vw" is a value of the induced voltage generated in the fan motor (77) before activation, "r1" is a resistance of the first resistor (27a), and "r2" is a resistance of the second resistor (27b). Thus, the detection circuit (27) outputs the induced voltage divided by the first resistor (27a) and the second resistor (27b). Note that the capacitor (27c) is connected in parallel with the second resistor (27b).

Since the resistances "r1" of the first resistor (27a) and the "r2" of the second resistor (27b) are set relatively high, the detection circuit (27) is configured to have a relatively high impedance. This is because a low impedance of the detection circuit (27) causes a current to flow during the operation of the outdoor fan (76) from the inverter circuit (23) side or the fan motor (77) side through the resistors (27a, 27b) to GND. Such a current flow causes power loss. Furthermore, if the current flows through both of the resistors (27a, 27b), the resistors (27a, 27b) have to have a high breakdown voltage.

In the first embodiment, for example, the first resistor (27a) is to have a resistance of "100 kΩ", and the second resistor (27b) is to have a resistance of "200 k".

The switching controller (28) controls ON-OFF of each of the switching elements (25u, 25v, 25w, 26u, 26v, 26w) in the inverter circuit (23). The switching controller (28) includes: a gate driver (29) connected to the switching elements (25u, 25v, 25w, 26u, 26v, 26w); and a microcomputer (30) having a central processing unit (CPU) and a memory, and connected to the gate driver (29). The switching controller (28)—that is, specifically, the microcomputer (30)—receives from an integrated controller (not shown) an instruction for starting the operation of the outdoor fan (76). The switching controller (28) then obtains a rotation speed of the fan motor (77) before activation in accordance with the result of detection by the detection circuit (27), and determines an activation sequence of the fan motor (77) based on the obtained rotation speed.

Specifically, the memory stores sets of information each associating a rotation speed range with an activation sequence. The microcomputer (30) of the switching controller (28) obtains the rotation speed, of the fan motor (77), with reference to an induced voltage detected at the present moment by the detection circuit (27). The microcomputer (30) then extracts an activation sequence corresponding to the rotation speed range of the obtained rotation speed. Based on the extracted activation sequence, the gate driver (29) controls each ON-OFF of the upper-arm switching elements (25u, 25v, 25w) and the lower-arm switching elements (26u, 26v, 26w) to activate the fan motor (77).

In an example case, if the result of detection by the detection circuit (27) indicates "0"; that is, if no induced voltage is generated, the fan motor (77) before activation is not rotating at the present moment. An activation sequence, of the fan motor (77), to be adopted here involves conducting a predetermined DC through the fan motor (77), once stopping a rotor of the fan motor (77) at a predetermined position, and then starting the activation of the fan motor (77) (activation control by positioning). If the result of detection by the detection circuit (27) is also found within a rotation speed range "faster than 0 rpm and slower than 150 rpm", the switching controller (28) performs the activation control by positioning.

If the obtained result of detection by the detection circuit (27) is found within a rotation speed range "faster than or equal to 150 rpm and slower than 190 rpm", the fan motor (77) is rotating; however, it is difficult to obtain the position of the rotor at this rotation speed. An activation sequence, of the fan motor (77), to be adopted here involves conducting a relatively large current through the fan motor (77) to force the fan motor (77) to start rotating, and then gradually increasing a frequency and a duty cycle of the voltage of the output AC power (SU, SV, SW) (activation by synchronous operations). If the result of detection by the detection circuit (27) is found within a rotation speed range "faster than or equal to 190 rpm and slower than 350 rpm", it is possible to obtain the position of the rotor. An activation sequence, of the fan motor (77), to be adopted here involves estimating a position of the rotor of the fan motor (77), and simultaneously activating the fan motor (77) without a sensor (activation by sensor-less operation).

If the result of detection by the detection circuit (27) is found within a rotation speed range "faster than or equal to 350 rpm", the fan motor (77) has already been rotating at a sufficient rotation speed. Hence, the switching controller (28) does not control the activation of the fan motor (77).

Note that the above examples show how to determine an activation sequence based on a rotation speed alone, regardless of a rotational direction of the fan motor (77); however, the activation sequence may further be determined based on the rotational direction before activation.

In particular, the switching controller (28) according to the first embodiment further performs switching control described below in detail, while the detection circuit (27) is detecting an induced voltage.

<Switching Control Before Activation of Motor>

When the air conditioner (70) starts operating the compressor (72) starts operating before the outdoor fan (76) does in the outdoor unit (71). While the outdoor fan (76) stops its operation, each of the switching elements (25u, 25v, 25w, 26u, 26v, 26w) of the inverter circuit (23) connected to the fan motor (77), is OFF. In this state, when the integrated controller (not shown) provides the instruction for starting the operation of the outdoor fan (76), the detection circuit (27) detects a W-phase induced voltage, and the switching controller (28) determines an activation sequence of the fan motor (77) based on the result of detection by the detection circuit (27). After the activation sequence is determined, the fan motor (77) is activated by ON-OFF of each switching element (25u, 25v, 25w, 26u, 26v, 26w).

In other words, when the induced voltage is detected, the lower-arm switching element (26w) and the upper-arm switching element (25W), both of which are in the W-phase and connected to the detection circuit (27), are OFF; that is, both of the switching elements are placed in a high impedance state. Moreover, the impedance of the detection circuit (27) is originally set high. Hence, when the induced voltage is detected, a part including the detection circuit (27), the wires (43, 44) and the W-phase switching element pair (24W) is placed in the high impedance state. Thus, the induced voltage is susceptible to superimposition of external noise caused by, for example, an inverter drive of the compressor (72).

The detection circuit (27) then detects the induced voltage with the external noise superimposed thereon, and the switching controller (28) determines an activation sequence of the fan motor (77) based on the divided induced voltage. Here, the external noise superimposed on the induced voltage could affect the switching controller (28), such that the switching controller (28) would falsely select a different activation sequence from the activation sequence to be really selected. In some cases, the false selection could cause a failure in the activation, such as abnormal activation, of the fan motor (77).

Figure 3:
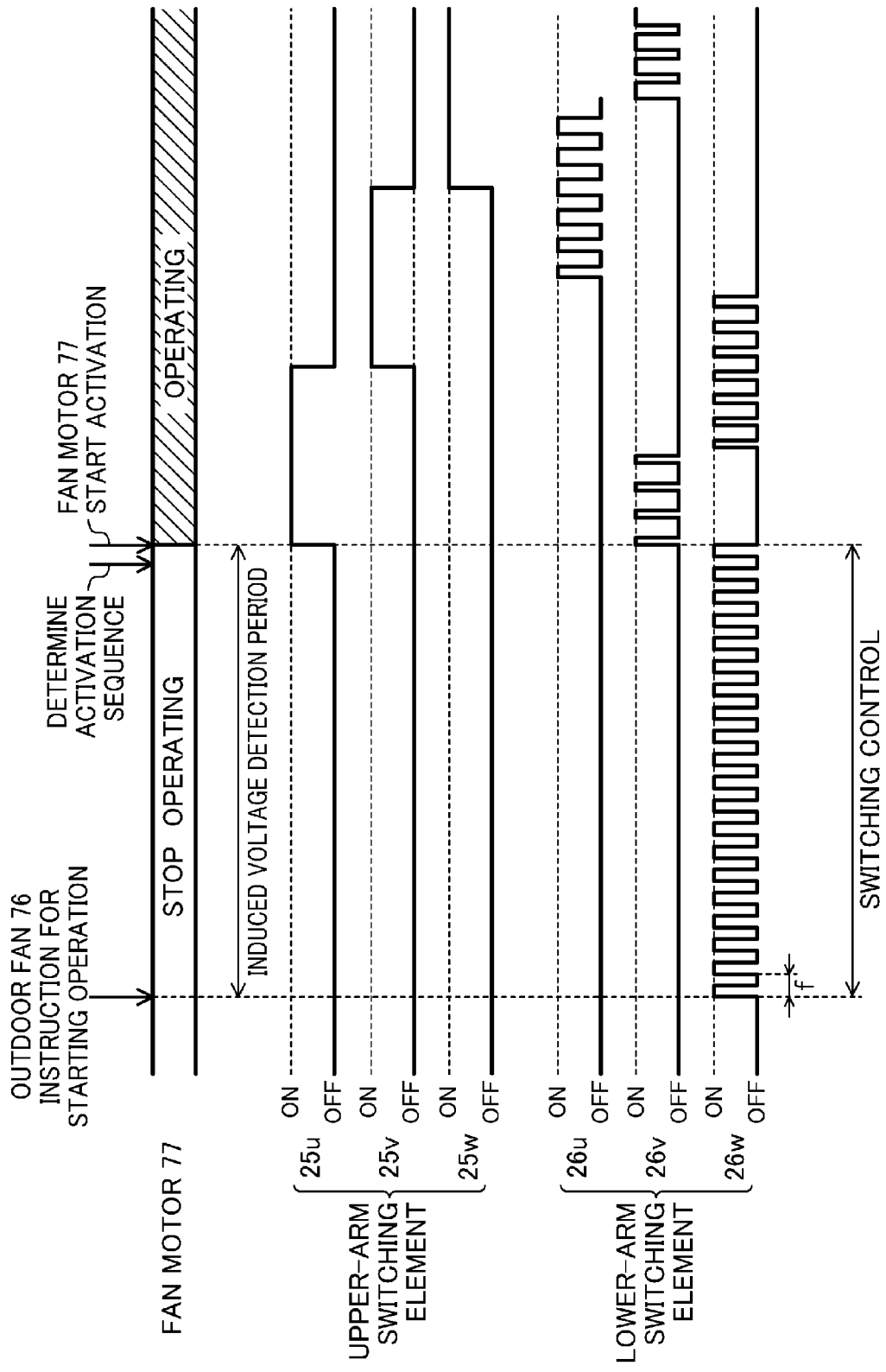
FIG. 3 is a flowchart illustrating how the power conversion device operates before and after the activation of a fan motor.

Hence, as illustrated in FIG. 3, the switching controller (28) according to the first embodiment obtains the instruction for starting the operation of the outdoor fan (76). Then, before determining an activation sequence based on the result of detection by the detection circuit (27), the switching controller (28) performs switching control which causes only the W-phase lower-arm switching element (26w) to alternately turns ON and OFF at a predetermined frequency of "f". Specifically, when the detection circuit (27) detects the W-phase induced voltage, the switching controller (28) alternately turns ON and OFF only the lower-arm switching element (26w), which corresponds to the W-phase intended for the detection of the induced voltage, at the predetermined frequency of "f". While the lower-arm switching element (26w) is turning ON and OFF, the switching controller (28) determines an activation sequence of the fan motor (77), using the induced voltage detected by the detection circuit (27).

Note that, during the switching control, the V-phase lower-arm switching element (26v), the U-phase lower-arm switching element (26u), and all the upper-arm switching elements (25u,25v,25w) are not intended for the detection of the induced voltage, and left OFF.

As illustrated in FIG. 1, the switching control, which involves turning ON and OFF of the W-phase lower-arm switching element (26w), forms a current path allowing a current to be conducted from the W-phase drive coil (L3) through the wire (43) and the lower-arm switching element (26w) to a negative wire (45). An apparent impedance of the current path becomes lower with the switching control than without the switching control. In contrast, the impedance of the detection circuit (27), previously set high by the first resistor (27a) and the second resistor (27b), is left so.

The impedance of the current path becomes low in the switching control as described above, and the low impedance keeps the external noise from being superimposed on the induced voltage generated in the fan motor (77). Even if the external noise is superimposed on the induced voltage, a current having the external noise will flow into the current path including the lower-arm switching element (26w) which is turning ON and OFF. As a result, the external noise alone may be removed from the induced voltage. Such features allow the detection circuit (27) to detect an external-noise-free induced voltage. Hence, the switching controller (28) may obtain, from the induced voltage, the rotation speed of the fan motor (77) at the present moment (i.e., the rotation speed of the fan motor (77) before activation), and determine an activation sequence of the fan motor (77) based on the obtained rotation speed. Therefore, the fan motor (77) may be activated well without a failure in the activation.

Here, the predetermined frequency "f" in FIG. 3 is higher than a frequency of the induced voltage generated in the fan motor (77) before activation. This is because the high predetermined frequency "f" keeps the external noise from being superimposed on the induced voltage, and successfully reduces the external noise alone. The high predetermined frequency "f" simultaneously minimizes the reduction of the induced voltage value by the switching control. In a detection period of the induced voltage, suppose the predetermined frequency "f" is relatively low and the W-phase lower-arm switching element (26w) keeps ON for a relatively long time. In relation to the long ON time, the impedance of the current path becomes lower. Accordingly, less external noise is superimposed on, and more external noise is removed from, the induced voltage; however, the induced voltage to be detected inevitably becomes even lower and comes closer to the potential of the negative wire (45). Thus, appropriately turning ON and OFF the lower-arm switching element (26w) desirably adjusts the predetermined frequency "f" to the degree that the impedance of the current path including the lower-arm switching element (26w) falls appropriately. Specifically, the predetermined frequency "f" may desirably keep the external noise from being superimposed on the induced voltage, allow the current having the external noise to flow toward the current path, and further, lower the impedance of the current path to the degree that the switching control does not cause a significant decrease in the value of the induced voltage.

More specifically, the predetermined frequency "f" is set five or more times as high as the frequency of the induced voltage generated in the fan motor (77) before activation; that is, the W-phase induced voltage to be detected. More beneficially, the predetermined frequency "f" is set approximately ten times as high as the frequency of the induced voltage. For example, if the fan motor (77) has a maximum rotation speed of approximately "1,000 rpm" when the outdoor fan (76) with its operation stopped rotates by headwind, the induced voltage generated in the fan motor (77) has a frequency of approximately "66.7 Hz". Here, the predetermined frequency "f" is set to approximately "333.5 Hz" or higher, and more beneficially, to as high as approximately "667 Hz". Note that the duty cycle is set to approximately 50%.

The upper limit of the predetermined frequency "f" is beneficially lower than a frequency of the external noise superimposed on the induced voltage. If the predetermined frequency "f" becomes excessively higher than the frequency of the external noise, the induced voltage that should be originally sinusoidal is smoothed. As a result, the rotation speed of the fan motor (77) before activation could not be obtained.

As illustrated in FIG. 3, the switching controller (28) performs the switching control at the predetermined frequency "f" during the detection period of the induced voltage, and determines an activation sequence of the fan motor (77) based on the result of the detection of the induced voltage. The switching controller (28) then stops the switching control and starts the activation of the fan motor (77). Specifically, the switching controller (28) starts the switching control upon obtaining an instruction for starting operation of the outdoor fan (76), and continues the switching control until the switching controller (28) starts activating the fan motor (77). Such features allow the lower-arm switching element (26w), which is subject to turning ON and OFF by the switching control, to be used without any problem even when the fan motor (77) is activated.

Effects of First Embodiment

In the first embodiment, when the detection circuit (27) detects the induced voltage of the fan motor (77) before activation, the switching controller (28) performs the switching control that causes the lower-arm switching element (26w) to alternately turn ON and OFF. In accordance with the induced voltage detected in the switching control, the switching controller (28) controls the ON and OFF of the switching elements (25u, 25v, 25w, 26u, 26v, 26w) to activate the fan motor (77).

An apparent impedance of the current path including the W-phase drive coil (L3), the wire (43), and the lower-arm switching element (26w) becomes lower with the switching control than without the switching control. Such a feature keeps the external noise from being superimposed on the induced voltage. Even if the external noise is superimposed on the induced voltage, the current having the external noise flows toward the current path. Hence, the detection circuit (27) may detect an external-noise-free induced voltage, and the switching controller (28) may activate the fan motor (77) in accordance with the induced voltage. Such features may reduce the occurrence of a failure in the activation of the fan motor (77).

Moreover, in the switching control according to the first embodiment, the predetermined frequency "f" is set higher than a frequency of the induced voltage. In the switching control, this high predetermined frequency "f" may appropriately lower the impedance of the current path including the lower-arm switching element (26w). As a result, the detection circuit (27) may detect an induced voltage having (i) no external noise superimposed thereon and (ii) a voltage value which is not excessively low.

Specifically, in the first embodiment, the switching control is provided to the lower-arm switching element (26w) corresponding to the W-phase intended for the detection of the induced voltage. Hence, the detection circuit (27) may detect the induced voltage with no external noise superimposed thereon. Thus, the switching control does not have to be provided to the lower-arm switching elements (26u, 26v) corresponding to the phases not intended for the detection of the induced voltage. This feature allows the switching control to be performed easily.

Moreover, in the first embodiment, the switching control of the lower-arm switching element (26w) continues until the fan motor (77) starts its activation. Specifically, the lower-arm switching element (26w), used for activating the fan motor (77), functions to lower the impedance until before the activation of the fan motor (77). Such features allow the fan motor (77) to be activated without any problems.

Second Embodiment

Figure 4:
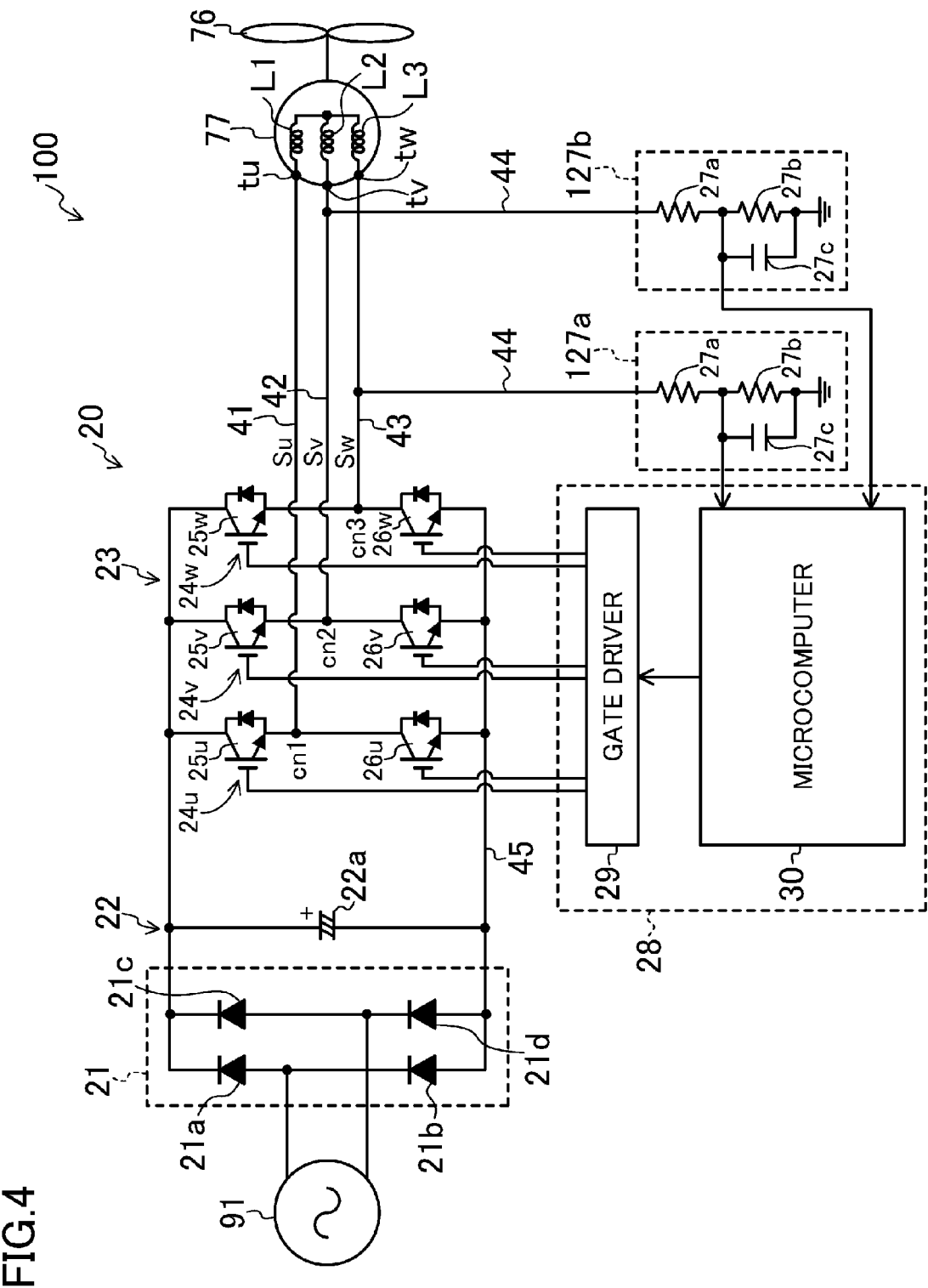
FIG. 4 is a block diagram of a motor driving system including a power conversion device according to a second embodiment.

The first embodiment describes the case where one detection circuit (27) is provided to the power conversion device (20). As illustrated in FIG. 4, the second embodiment describes a case where the power conversion device (20) includes two detection circuits (127a, 127b) each corresponding to one of two phases (the W-phase and the V-phase). In particular, the description below explains a configuration different from that in the first embodiment.

The detection circuit (127a) has an input connected through the wire (44, 43) to the connection node (cn3) and the drive coil (L3) both in the W-phase. The detection circuit (127a) detects an induced voltage generated in the W-phase of the fan motor (77) before activation. The detection circuit (127b) is connected through the wire (44, 42) to the connection node (cn2) and the drive coil (L2) both in the V-phase. The detection circuit (127b) detects an induced voltage generated in the V-phase of the fan motor (77) before activation. The configuration of each detection circuit (127a, 127b) is the same as that of the detection circuit (27) according to the first embodiment.

The switching controller (28) is connected to outputs of the detection circuits (127a, 127b), and obtains a voltage difference between the W-phase induced voltage detected by the detection circuit (127a) and the V-phase induced voltage detected by the detection circuit (127b). The switching controller (28) determines an activation sequence of the fan motor (77), using the obtained voltage difference, and activates the fan motor (77) in accordance with the determined activation sequence.

While the detection circuits (127a, 127b) are detecting the induced voltages, the switching controller (28) in the second embodiment also performs the switching control. In the switching control, the W-phase lower-arm switching element (26w) corresponding to the detection circuit (127a) and the V-phase lower-arm switching element (26v) corresponding to the detection circuit (127b) alternately turn ON and OFF at a predetermined frequency of "f". The predetermined frequency "f" is higher than the frequencies of the induced voltages generated in the W-phase and the V-phase. The lower-arm switching elements (26w, 26v) synchronously turn ON and OFF. Such switching control is performed until the fan motor (77) starts to activate.

Note that, during the switching control, the U-phase lower-arm switching element (26u), and all the upper-arm switching elements (25u,25v,25w) are not intended for the detection of the induced voltage, and left OFF.

Similar to the detection circuit (27) in FIG. 1, each of the detection circuits (127a, 127b) includes the capacitor (27c) connected in parallel to the second resistor (27b). If the switching control according to the second embodiment is not performed, the W-phase induced voltage and the V-phase induced voltage have external noise superimposed thereon. Thus, each capacitor (27c) is charged with electric charge accompanied by the external noise. Then, from each detection circuit (127a, 127b), the result of detection (i.e., divided induced voltage) is output to the switching controller (28). Here, the result of detection inevitably has a high voltage value and a distorted waveform both provided from the charged capacitor (27c). The voltage difference between the results of detection is smaller when the external noise is superimposed than when no external noise is superimposed. Since the obtained voltage difference is small, the switching controller (28) could inevitably calculate a different rotation speed from the actual rotation speed as the rotation speed of the fan motor (77) before activation. Such a miscalculation affects the determination of an activation sequence of the fan motor (77).

In contrast, the second embodiment involves the switching control on the lower-arm switching elements (26v, 26w)

in the detection of the W-phase induced voltage and the V-phase induced voltage of the fan motor (77) before activation, as described above. Because of the switching control, an apparent impedance of a current path including the drive coil (L3), the wire (43), and lower-arm switching element (26*w*), and another apparent impedance of a current path including the drive coil (L2), the wire (42), and the lower-arm switching element (26*v*) become lower than those without switching control. The result of detecting the induced voltages by the detection circuits (127*a*, 127*b*) shows the W-phase induced voltage and V-phase induced voltage with no external noise superimposed thereon. Hence, the switching controller (28) may calculate the voltage difference out of the W-phase induced voltage and the V-phase induced voltage both free from external noise, and determine an activation sequence of the fan motor (77). Such features may reduce the occurrence of a failure in the activation of the motor (77).

Other Embodiments

The first and second embodiments may be implemented in the manners below.

The motor to be provided with power by the power conversion device (20) shall not be limited to the fan motor (77) of the outdoor fan (76). Any given motor may be provided with power by the power conversion device (20) as long as the motor can rotate in reverse or forward direction before activation.

The type and number of phases intended for the detection of an induced voltage shall not be limited to those in the first and second embodiments. Moreover, the number of phases that the fan motor (77) has does not have to be three.

The predetermined frequency "f" (FIG. 3) in the switching control has to be set to lower the impedance of a current path to the degree that the low impedance (i) keeps external noise from being superimposed on an induced voltage, and (ii) allows a current having the noise to flow through a current path including a switching element (26*v*, or 26*v* and 26*w*). However, the predetermined frequency "f" does not necessarily have to be set to a frequency unless the set frequency lowers the value of the induced voltage much by the switching control. For example, the impedance of the current path in the switching control can be predicted from the predetermined frequency "f" and its duty cycle. Hence, from the predicted impedance, a voltage drop of the induced voltage may be predicted, and, based on the predicted voltage drop, the upper and lower limits of the rotation speed range may be appropriately changed when an activation sequence of the fan motor (77) is determined.

The lower-arm switching element receiving the switching control may include not only an element corresponding to a phase intended for the detection of the induced voltage, but also an element corresponding to a phase not intended for the detection of the induced voltage. For example, the lower-arm switching elements (26*u*, 26*v*, 26*w*) in all the phases may receive the switching control even if either one or two phases are intended for the detection of the induced voltage.

The switching control has to be executed while the detection circuit (27) or the detection circuits (127*a* 127*b*) are detecting the induced voltage; however, the switching control does not have to be executed until immediately before the activation of the fan motor (77). Specifically, the switching controller (28) does not have to execute the switching control even before the fan motor (77) activates, unless the detection circuit (27) or the detection circuits (127*a* 127*b*) are detecting the induced voltage.

INDUSTRIAL APPLICABILITY

As can be seen, the present invention is useful for a power conversion device to determine an activation sequence of a motor, using an induced voltage of the motor before activation.

DESCRIPTION OF REFERENCE CHARACTERS cn1, cn2, cn3 Connection Node
23 Inverter Circuit
24*u*, 24*v*, 24*w* Switching Element Pair
25*u*, 25*v*, 25*w* Upper-Arm Switching Element
26*u*, 26*v*, 26*w* Lower-Arm Switching Element
27, 127*a*, 127*b* Detection Circuit
28 Switching Controller
70 Air Conditioner
77 Motor (Fan Motor)

The invention claimed is:

1. A power conversion device which supplies power to a motor having phases and included in an air conditioner, the power conversion device comprising:
    an inverter circuit including:
        a switching element pair constituted of an upper-arm switching element and a lower-arm switching element connected in series to each other; and
        a connection node provided between the upper-arm switching element and the lower-arm switching element, and connected to the motor, the switching element pair including as many switching pairs as the phases of the motor;
    a detection circuit connected to the connection node, and configured to detect an induced voltage, of the motor before activation, in at least one of the phases in the motor; and
    a switching controller capable of activating the motor, by controlling ON and OFF of the upper-arm switching element and the lower-arm switching element, in accordance with a result of the detection by the detection circuit,
    the switching controller being configured to perform switching control causing at least one of lower-arm switching elements, including the lower-arm switching element corresponding to the one phase intended for the detection of the induced voltage, to alternately turn ON and OFF, at a predetermined frequency higher than a frequency of the induced voltage, when the detection circuit detects the induced voltage.

2. The power conversion device of claim 1, wherein
    the detection circuit includes two detection circuits, the induced voltage includes at least two induced voltages each having one of two phases included in the phases of the motor, and each of the detection circuits is configured to detect a different one of the induced voltages, and
    the switching controller is configured to obtain a voltage difference between the induced voltages detected by each of the two detection circuits, and activate the motor, using the obtained voltage difference.

3. The power conversion device of claim 1, wherein the switching controller is configured to perform the switching control until the switching controller starts activating the motor.

4. The power conversion device of claim 2, wherein the switching controller is configured to perform the switching control until the switching controller starts activating the motor.

\* \* \* \* \*